(12) United States Patent
Kim et al.

(10) Patent No.: US 7,088,894 B2
(45) Date of Patent: Aug. 8, 2006

(54) OPTICAL CABLE HAVING WAVED METAL TUBE, AND METHOD AND APPARATUS FOR PRODUCING THE SAME

(75) Inventors: June-Sun Kim, Gyeonggi-do (KR); Euy-Don Park, Gyeongsangbuk-do (KR); Min Son, Gyeongsangbuk-do (KR)

(73) Assignee: LG Cable Ltd., Seoul (KR)

( * ) Notice: Subject to any disclaimer, the term of this patent is extended or adjusted under 35 U.S.C. 154(b) by 178 days.

(21) Appl. No.: 10/782,421

(22) Filed: Feb. 19, 2004

(65) Prior Publication Data

US 2004/0165844 A1    Aug. 26, 2004

(30) Foreign Application Priority Data

Feb. 26, 2003    (KR)    ...................... 10-2003-0012131

(51) Int. Cl.
*G02B 6/44* (2006.01)

(52) U.S. Cl. ...................................... 385/104; 385/111

(58) Field of Classification Search ......... 385/109–111
See application file for complete search history.

(56) References Cited

U.S. PATENT DOCUMENTS

| 4,690,499 | A | * | 9/1987 | Taylor et al. | ................ | 385/111 |
| 4,846,566 | A | * | 7/1989 | Barnett et al. | ............... | 385/109 |
| 5,274,726 | A | * | 12/1993 | Rawlyk et al. | .............. | 385/109 |
| 6,697,556 | B1 | * | 2/2004 | Militaru et al. | ............. | 385/100 |

FOREIGN PATENT DOCUMENTS

WO    WO 00/77552 A1    * 12/2000

* cited by examiner

*Primary Examiner*—John D. Lee
(74) *Attorney, Agent, or Firm*—Welsh & Katz

(57) ABSTRACT

An optical cable having a metal tube receiving an optical fiber and bent to form a waved shape is disclosed. The optical cable may prevent cutoff of the optical fiber or deterioration of optical characteristics though tensile force is applied to the optical cable in its longitudinal direction since the metal is formed in a waved shape. To bend the metal tube, the metal tube is passed through roller pair(s) which are shaken in a direction perpendicular to the advancing direction of the metal tube. Thus, it is possible to obtain excess fiber length (EFL) easily and accurately as desired.

11 Claims, 4 Drawing Sheets

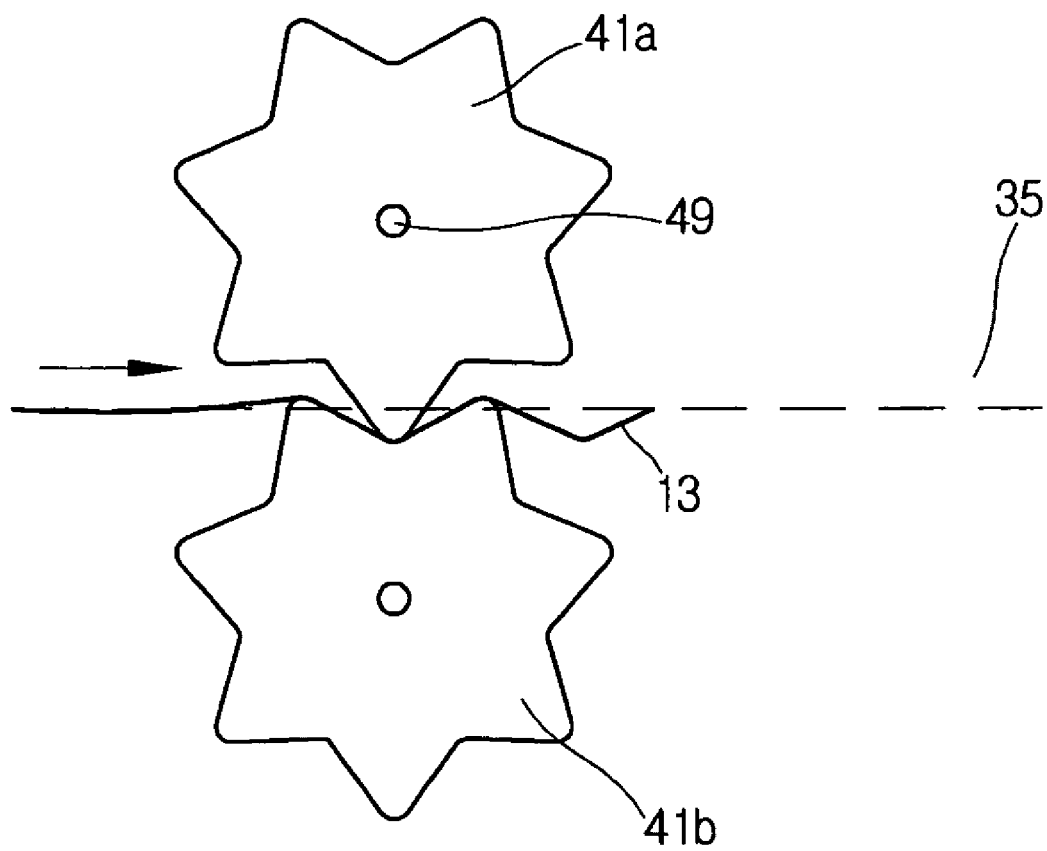

OPTICAL CABLE HAVING WAVED METAL TUBE, AND METHOD AND APPARATUS FOR PRODUCING THE SAME

BACKGROUND OF THE INVENTION

1. Field of the Invention

The present invention relates to an optical cable, and more particularly to an optical cable capable of enduring tensile force applied from outside.

2. Description of the Related Art

An optical cable has one or more optical fiber which shows sensitive optical features against an external force, so several protective layers are coated on the optical fiber so that the optical fiber is sufficiently protected from the external force during or after installation of the optical cable.

Though the optical cable has a thick protective layer, a section of the optical fiber is no more than several millimeters with a long length. Thus, if the optical fiber is inserted into the optical cable by a length identical to the optical cable, the optical fiber is apt to be easily cut off or stretched in a longitudinal direction due to the external tension or the change of external temperature caused by the change of seasons, thereby deteriorating optical characteristics of the optical cable.

In order to solve this problem, there is proposed a method for inserting an optical fiber into a metal tube and then surrounding the metal tube with a sheath to make an optical cable, in which the optical fiber has a length somewhat longer than the metal tube. At this time, a length of the optical fiber in excess of the optical fiber is called excess fiber length (EFL). Though the sheath and the metal tube are expanded or contracted due to external tension, the optical fiber in the optical cable is not influenced by the external tension since EFL is prepared.

Seeing conventional techniques for generating EFL, there is a method for spirally twisting an optical fiber to be put into the metal tube, and then surrounding the optical fiber with a metal tube so that the spiral optical fiber has a longer length than the straight metal tube.

As another method, a straight metal tube having wrinkled surface is used. In this method, an optical fiber is inserted into the wrinkled metal tube, which is then surrounded by a sheath to make an optical cable. At this time, a cooling process is executed so that the wrinkled metal tube is shortened when the sheath of the optical cable is thermally contracted, thereby making the length of the optical fiber longer than the contracted optical cable.

However, such conventional methods have problems that the optical cable is significantly affected by characteristics of the optical fiber inserted into the cable as well as material or composition of the metal tube. In particular, in case a plurality of optical fibers are received in an optical cable, EFL formed depending on the number of optical fibers and the size of the optical cable does not have a constant value, so it is not easy to control the processes for obtaining a desired EFL.

SUMMARY OF THE INVENTION

The present invention is designed to solve the problems of the prior art, and therefore it is an object of the present invention to provide an optical cable capable of enduring tensile force in a simple and reliable way.

Another object of the present invention is to provide method and apparatus for manufacturing an optical cable which is capable of enduring tensile force in a simple and reliable way.

In order to accomplish the above object, the present invention provides an optical cable which includes a metal tube bent to have a waved shape along a longitudinal direction thereof; and at least one optical fiber received in the metal tube with forming a waved shape according to the metal tube.

Thus, though the optical cable receives tensile force in its longitudinal direction, the metal tube is spread straightly, so it is possible to prevent cutoff of the optical fiber or deterioration of optical characteristics caused by a certain tensile force.

In addition, the optical cable may further include a sheath surrounding the metal tube, wherein the sheath has an appearance formed straight along the longitudinal direction of the metal tube so that the optical fiber received in the metal tube has a length relatively longer than the sheath.

In order to manufacture such an optical cable, the present invention provides a method for manufacturing an optical cable, which includes the steps of preparing a metal tube in which an optical fiber is received; transferring the metal tube to a longitudinal direction thereof at a predetermined speed; and bending the metal tube so that the transferred metal tube forms a waved shape in an advancing direction thereof.

Preferably, the bending step includes the step of passing the metal tube between a pair of rollers which are oppositely rotating, wherein, as the pair of rollers are rotating, a trajectory drawn by opposite points on the rollers is shaken in a direction perpendicular to the advancing direction of the metal tube so that the metal tube is bent to form a waved shape in the advancing direction.

In addition, the metal tube may also be bent by arranging at least two pairs of rollers along the advancing direction of the metal tube, and then passing the metal tube through each pair of rollers. In other words, the bending step includes passing the metal tube through a first pair of rollers which are oppositely rotated, and through a second pair of rollers which are spaced apart from the first pair of rollers along the advancing direction and oppositely rotated, trajectories drawn by opposite points of the first and second pairs of rollers are periodically shaken in a direction perpendicular to the advancing direction as the first and second pairs of rollers rotates so that the metal tube is bent in the advancing direction, and the first and second pairs of rollers have the same shaking period and are arranged to have a phase difference as much as a half period so that the first pair of rollers and the second pair of rollers are shaken to opposite directions.

According to another aspect of the invention, there is also provided an apparatus for manufacturing an optical cable, which includes a first pair of rollers which are rotated oppositely so that a metal tube receiving an optical fiber therein is passed through the rollers in a longitudinal direction thereof. At this time, as the first pair of rollers are rotated, a trajectory drawn by opposite points on the first pair of rollers is shaken in a direction perpendicular to an advancing direction of the metal tube so that the metal tube passing through the first pair of rollers is bent to form a waved shape in the advancing direction.

The pair of rollers on which opposite points are shaken as described above may be a pair of eccentric cams, and the pair of rollers may be rollers having toothed or star-like sections, engaged to each other. In addition, the at least one of the first pair of rollers may be an eccentric cam having a circular, oval or fan-shaped section, and the other one of the first pair of rollers may be elastically biased oppositely with the use of an elastic means.

BRIEF DESCRIPTION OF THE DRAWINGS

Other objects and aspects of the present invention will become apparent from the following description of embodiments with reference to the accompanying drawing in which:

FIGS. 5a and 5b show other examples of the roller pairs used for bending the metal tube according to the present invention.

DESCRIPTION OF THE PREFERRED EMBODIMENT

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
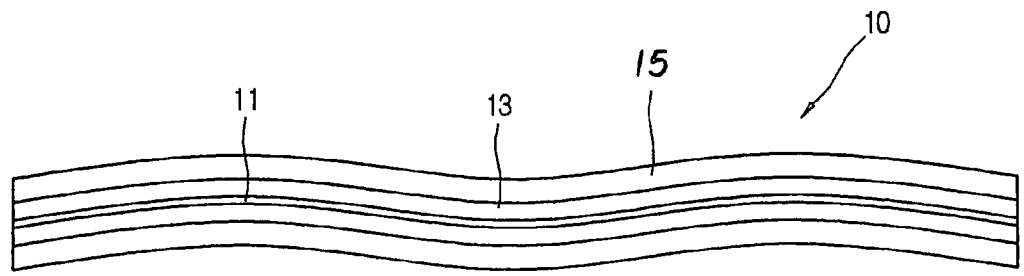
FIG. 1 is a sectional view schematically showing an optical cable according to an embodiment of the present invention.

FIG. 1 is a sectional view showing an optical cable according to an embodiment of the present invention. Referring to FIG. 1, the optical cable 10 of this embodiment includes an optical fiber 11, a metal tube 13 and a sheath 15.

The optical fiber 11 has core and clad, and the optical fiber 11 is made by drawing an optical fiber preform made of such as quartz glass. Generally, the optical fiber is sometimes surrounded by a thin buffer layer made of such as silicon resin in order to protect the optical fiber from external force. In addition, though it is shown that one optical fiber is provided in the optical cable 10, two or more optical fibers may be provided. Moreover, a tensile wire made of elastic material may also be positioned around the optical fiber 11. Furthermore, in case two or more optical fibers are included in the optical cable, the optical fibers may be spirally twisted, in some cases twisted together with the tensile wire which is positioned under the necessity.

The metal tube 13 is made of metal having good malleability and ductility such as copper or aluminum, and the metal tube 13 is bent to form a smooth waved shape along its longitudinal direction as shown in FIG. 1. Thus, the optical fiber 11 received in the metal tube 13 is also formed in a waved shape according to the metal tube 13. On the other hand, while the outer diameter of the metal tube 13 is several mm, the outer diameter of the optical fiber 11 received in the metal tube 13 is several hundred μm though a buffer layer is provided. Thus, there exists a gap between the optical fiber 11 and the metal tube 13, so the optical fiber 11 is somewhat freely movable in the metal tube 13. In addition, the gap may be filled with soft gel in order to prevent penetration of moisture or dusts.

The sheath 15 is made of polyethylene, PVC, flame retardant plastic or the like, and the sheath 15 forms a smooth waved shape according to the shape of the metal tube 13 with surrounding the metal tube 13.

As mentioned above, the optical cable 10 of this embodiment does not have EFL since the sheath 15 and the optical fiber 11 have substantially identical length. However, the optical cable 10 may endure tensile force to some extent with being straightly extended in its longitudinal direction since it forms a smooth waved shape in its longitudinal direction.

Figure 2:
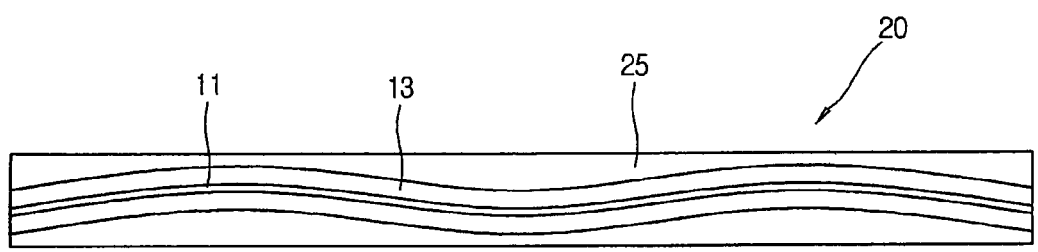
FIG. 2 is a sectional view schematically showing an optical cable according to another embodiment of the present invention.

FIG. 2 is a sectional view showing an optical cable according to another embodiment of the present invention. Description of the optical cable 20 of this embodiment will be focused on different facts to the optical cable 10 of the former embodiment.

The optical cable 20 of this embodiment includes the optical fiber 11, the metal tube 13 and the sheath 25 like the optical cable 10 of the former embodiment, but its appearance is formed straight along its longitudinal direction without forming a waved shape. Thus, in the optical cable 20 of this embodiment, the metal tube 13 and the optical fiber 11 having a waved shape are longer than the sheath 25. In other words, since there is provided EFL as much as the optical fiber 11 and the metal tube 13 are bent (EFL will be described in more detail later), when the optical cable 20 is elongated due to external force, the metal tube 13 is extended along with the elongated sheath 25. Thus, the tensile force caused by the external force is absorbed to the metal tube 23, not affecting on the optical fiber 11.

Now, method and apparatus for manufacturing the optical cable 10 or 20 having the metal tube 13 bent in a waved shape as mentioned above will be described with reference to FIGS. 3a to 3c and 4.

Figure 3A:
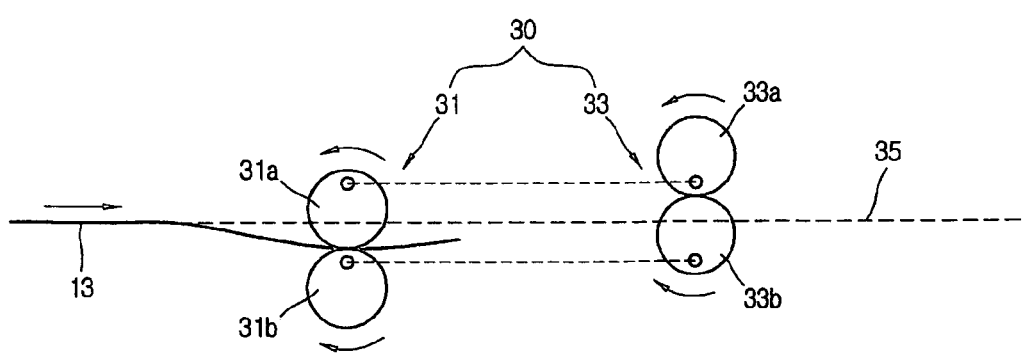
FIGS. 3a to 3c are drawings for illustrating the process of bending a metal tube according to an embodiment of the present invention.
Figure 4:
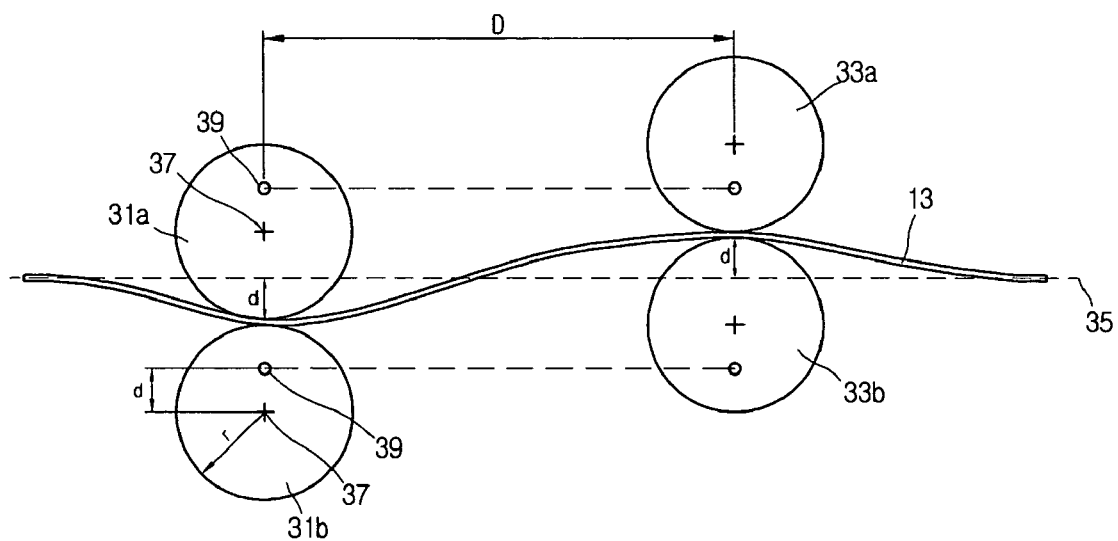
FIG. 4 is an expanded view showing roller pairs shown in FIGS. 3a to 3c for illustrating EFL generated according to the present invention.

As shown in FIGS. 3a and 4, the apparatus of this embodiment has two pairs of rollers 30. These two pairs of rollers 30 are pairs of eccentric cams 31a and 31b, 33a and 33b, each having a circular section. The eccentric cams 31a and 31b, 33a and 33b are engaged with each other and rotating, and plays a role of bending the metal tube 13 in a waved shape with moving the metal tube 13 between the engaged eccentric cams 31a and 31b, 33a and 33b. Two pairs of rollers 30 are oppositely rotated at the same speed, and as the rollers 30 are rotated, a trajectory drawn by opposite points on the pairs of rollers 30 is periodically shaken vertically, seen from the drawing, on the basis of a center line 35 along which the metal tube 13 is supplied. In addition, each eccentric cam 31a, 31b, 33a or 33b of two pairs of roller 30 has the same radius (r) and the same eccentricity (d). Moreover, the first pair of rollers 31 and the second pair of rollers 33 are positioned so that a distance (D) between the first and second pairs of rollers 31 and 33 is corresponding to a half period of the waved shape of the metal tube 13. In other words, the first pair of rollers 31 and the second pair of rollers 33 are arranged to satisfy the following equation 1, to have a phase difference of a half period so that the second pair of rollers 33 is moved above the center line while the first pair of rollers 31 are moved lower below the center line, or vice versa).

$$D = 3.14 \times (r+d) \text{(mm)} \quad (1)$$

Figure 3B:
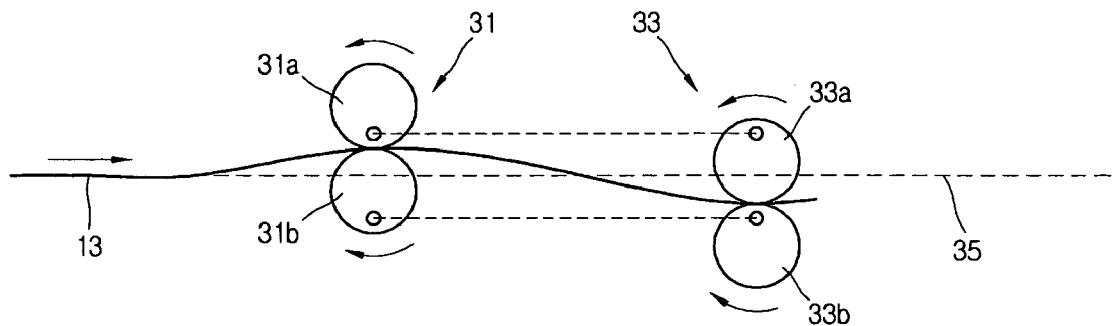
Figure 3C:
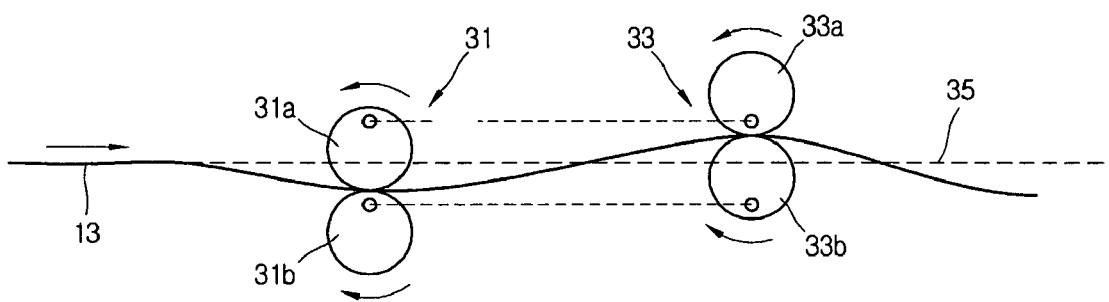

The process of bending the metal tube with the use of the above-mentioned apparatus is described in detail. At first, as shown in FIG. 3a, the metal tube 13 receiving an optical fiber therein is advanced along the center line 35 between the first pair of rollers 31, and then the metal tube 13 is bent downward, seen from the drawing, according to the waved shape drawn by the first pair of rotating rollers 31. Subsequently, if a half period passes, or if two pairs of rollers 30 rotates a half cycle, a front end of the metal tube 13 is advanced between the second pair of rollers 33. And then, as shown in FIG. 3b, the first pair of rollers 31 bends the metal tube 13 upward, seen from the drawing, while the second pair of rollers 33 draws a trajectory shaking downward so as to secure the bending of the metal tube 13 which is already bent downward before a half period. If a half period is additionally passed, as shown in FIG. 3c, the first pair of rollers 31 bends the metal tube 13 downward, while the second pair of rollers 33 draws a trajectory shaking upward so as to secure the bending of the metal tube 13 which is already bent upward before a half period. This procedure is repeated so that the metal tube is bend to form a smooth waved shape.

Then, the sheath 25 surrounding the metal tube 13 is formed by a conventional way, and then the optical cable 10 or 20 as shown in FIG. 1 or 2 is obtained.

EFL of the metal tube bent as above may be defined by a ratio of difference between a horizontal length (D) and a linear-approximate length $((D^2+4d^2)^{1/2})$ for the horizontal length, as shown in the following equation 2.

$$EFL = \frac{(D^2 + 4d^2)^{1/2} - D}{D} \times 100 \ (\%) \quad (2)$$

On the other hand, rpm (revolutions per minute) of two pairs of roller 30 is defined as expressed in the following equation 3, when a transfer velocity of the metal tube 13 is v.

$$\text{rpm} = 1000 \times v/2D \quad (3)$$

Thus, a desired EFL may be accurately obtained by setting each parameter of the above equations appropriately.

Preferably, the elastic recovery of the metal tube is considered for obtaining more precise EFL.

On the other hand, though it is described that two pairs of rollers are provided in the apparatus of this embodiment, other modifications may be possible. In other words, the apparatus may further includes third and fourth pairs of rollers positioned with a phase difference of a half period, or the apparatus may be provided with only the first pair of rollers 31. In addition, an additional pair of rollers may be further installed between the first pair of rollers 31 and the second pair of rollers 33 to have a phase difference of ¼ period from the first and second pairs of rollers 31 and 33.

Furthermore, the pair of rollers may have a toothed or star-like sectional shape. As shown in FIG. 5a, if the metal tube 13 is passed through a pair of rollers 41a and 41b which are engaged with each other and rotated on the center of a rotary axis 49, the metal tube 13 may obtain a waved shape in which valleys and ridges are repeated in turn.

Figure 5B:
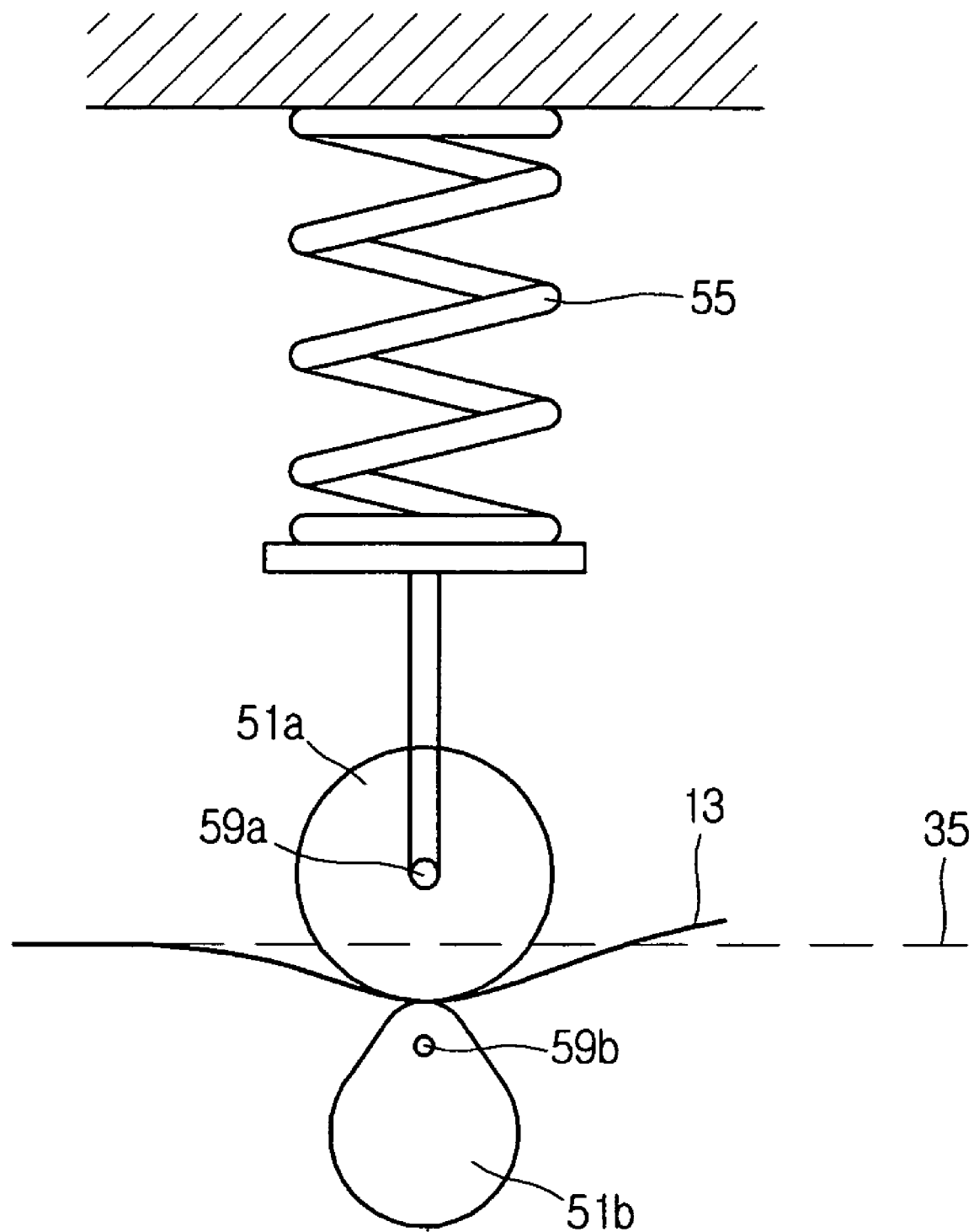

In addition, as shown in FIG. 5b, it is also possible that one of the roller pair 51b is an eccentric cam having a circular or oval section, while an opposite roller 51a is a common roller having a circular section. At this time, the roller 51a is elastically biased toward the eccentric cam 51b by means of an elastic means 55. In this configuration, as the eccentric cam 51b rotates on the center of a rotary axis 59b, the roller 51a is shaken vertically together with a rotary axis 59a. Thus, if the metal tube 13 is passed through the roller pair shown in FIG. 5b, the metal tube 13 is bent in a waved shape.

Though it is depicted and described that the roller 51b is an eccentric cam in FIG. 5b, a non-eccentric roller having a polygonal section such as triangle or rectangle may give a trajectory vertically shaken as the roller is rotated, thereby giving the same effect as the eccentric cam 51b. Furthermore, in addition to the roller pair 51a and 51b, a plurality of roller pairs may be installed to have a phase difference of a half period according to the principle described with reference to FIGS. 3a to 3c and 4.

APPLICABILITY OF THE INDUSTRY

According to the optical cable of the present invention described above, the metal tube receiving an optical fiber is bent in a waved shape, so it is possible to prevent the optical fiber from being cut off due to tensile force in a longitudinal direction of the optical cable.

In addition, according to the apparatus and method for manufacturing an optical cable of the present invention, a desired EFL may be accurately and reproducibly generated with a simple structure using roller pairs which draw a trajectory vertically shaken to an advancing direction of the metal tube.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for manufacturing an optical cable, comprising:
    preparing a metal tube in which an optical fiber is received;
    transferring the metal tube in a longitudinal direction thereof at a predetermined speed; and
    bending the metal tube so that the transferred metal tube forms a waved shape in an advancing direction thereof, wherein the bending step includes:
        passing the metal tube between a first pair of rollers which are oppositely rotating and arranged in a direction perpendicular to an advancing direction of the metal tube, and
        bending the metal tube to form a waved shape in the advancing direction thereof by shaking trajectories drawn by opposite points on the first pair of rollers, in a direction perpendicular to the advancing direction of the metal tube as the first pair of rollers are rotating.

2. A method for manufacturing an optical cable according to claim 1,
    wherein the bending step includes bending the metal tube in the advancing direction thereof by passing the metal tube, having passed through the first pair of rollers, through a second pair of rollers which are spaced apart from the first pair of rollers along the advancing direction and oppositely arranged in a direction perpendicular to the advancing direction of the metal tube,
    wherein trajectories drawn by opposite points of the second pairs of rollers are periodically shaken in a direction perpendicular to the advancing direction as second pairs of rollers rotates, and wherein the first and second pairs of rollers have the same shaking period and are arranged to have a phase difference as much as a half period so that the first pair of rollers and the second pair of rollers are shaken to opposite directions.

3. A method for manufacturing an optical cable according to claim 1, further comprising the step of forming a sheath surrounding the metal tube which has been bent to form a waved shape in the bending step.

4. A method for manufacturing an optical cable according to claim 3, wherein the sheath has an appearance formed straightly along the longitudinal direction of the metal tube.

5. A method for manufacturing an optical cable according to claim 3, wherein the sheath has an appearance bent in a waved shape according to the shape of the metal tube.

6. An apparatus for manufacturing an optical cable, comprising:
   a first pair of rollers which are rotated oppositely so that a metal tube receiving an optical fiber therein is passed through the rollers in a longitudinal direction thereof,
   wherein, as the first pair of rollers are arranged in a direction perpendicular to a length direction of the metal tube, and as the first pair of rollers are rotated, trajectories drawn by opposite points on the first pair of rollers are shaken in a direction perpendicular to an advancing direction of the metal tube so that the metal tube passing through the first pair of rollers is bent to form a waved shape in the advancing direction.

7. An apparatus for manufacturing an optical cable according to claim 6, further comprising a second pair of rollers spaced apart from the first pair of rollers along the advancing direction of the metal tube so that the metal tube passing through the first pair of rollers is passed through the second pair of rollers which are rotated oppositely,
   wherein, as the second pair of rollers are arranged in a direction perpendicular to a length direction of the metal tube, and as the first pair of rollers are rotated, trajectories drawn by opposite points on the second pair of rollers are periodically shaken in a direction perpendicular to the advancing direction of the metal tube, and
   wherein the second pair of rollers are arranged to have the same shaking period as the first pair of rollers and have a phase difference as much as a half period to the first pair of rollers so that the second pair of rollers is shaken in a direction opposite to the first pair of rollers.

8. An apparatus for manufacturing an optical cable according to claim 6, wherein the first pair of rollers are a pair of eccentric cams.

9. An apparatus for manufacturing an optical cable according to claim 6, wherein the first pair of rollers are rollers having toothed or star-like sections, engaged to each other.

10. An apparatus for manufacturing an optical cable according to claim 6,
    wherein at least one of the first pair of rollers is an eccentric cam having a circular, oval or fan-shaped section, and the first pair of rollers are elastically biased oppositely with the use of an elastic means.

11. An apparatus for manufacturing an optical cable according to claim 6,
    wherein at least one of the first pair of rollers is a roller having a polygonal section, and the first pair of rollers are elastically biased oppositely with the use of an elastic means.

* * * * *